United States Patent
Nogueroles Viñes et al.

(10) Patent No.: US 11,046,026 B2
(45) Date of Patent: Jun. 29, 2021

(54) METHODS FOR MANUFACTURING CURVED OMEGA STRINGERS AND Z SHAPED STRINGERS OF COMPOSITE MATERIAL AND FOR MANUFACTURING A COMPOSITE MATERIAL STIFFENED PANEL WITH CURVATURE

(71) Applicant: Airbus Operations, S.L., Getafe (ES)

(72) Inventors: Pedro Nogueroles Viñes, Getafe (ES); Maria Mora Mendías, Getafe (ES); Francisco Javier Chamorro Alonso, Getafe (ES); Aquilino García García, Getafe (ES)

(73) Assignee: Airbus Operations, S.L., Getafe (ES)

( * ) Notice: Subject to any disclaimer, the term of this patent is extended or adjusted under 35 U.S.C. 154(b) by 0 days.

(21) Appl. No.: 16/567,163

(22) Filed: Sep. 11, 2019

(65) Prior Publication Data

US 2020/0079034 A1 Mar. 12, 2020

(30) Foreign Application Priority Data

Sep. 11, 2018 (EP) .................................... 18382652

(51) Int. Cl.
| | | |
|---|---|---|
| *B29C 70/44* | (2006.01) | |
| *B29C 70/38* | (2006.01) | |
| *B29C 70/46* | (2006.01) | |

(52) U.S. Cl.
CPC ............ *B29C 70/44* (2013.01); *B29C 70/386* (2013.01); *B29C 70/446* (2013.01); *B29C 70/462* (2013.01)

(58) Field of Classification Search
CPC ...... B29C 70/44; B29C 70/462; B29C 70/446
See application file for complete search history.

(56) References Cited

U.S. PATENT DOCUMENTS

| | | | |
|---|---|---|---|
| 7,708,546 B2 | 5/2010 | Lee et al. | |
| 8,118,959 B2* | 2/2012 | Nelson | .................. B29C 33/308 156/220 |
| 9,561,602 B2 | 2/2017 | Jones et al. | |

(Continued)

FOREIGN PATENT DOCUMENTS

WO   2010047980 A1   4/2010

*Primary Examiner* — Matthew J Daniels
*Assistant Examiner* — Andrew L Swanson
(74) *Attorney, Agent, or Firm* — Greer, Burns & Crain, Ltd.

(57) ABSTRACT

A method for manufacturing curved composite material omega stringers, comprising: automatic tape laying-up in an ATL machine, an AFP machine or a FLU machine and automatic cutting of the contour, to achieve a straight preform with reinforcements; flat forming to obtain an omega shape on the straight preform to transform it into a straight omega shaped preform; and curve forming the straight omega shaped preform by placing it in a flexible tool comprising a longitudinally embedded stiff band and a laminate clamping arrangement, the laminate clamping arrangement being located in extreme positions of the flexible tool, the flexible tool being covered by a mechanical closing arrangement, such that a head of the straight omega shaped preform has reinforcements on both extremes, the reinforcements being held by the laminate clamping arrangement during the forming process, and afterwards the straight omega shaped preform is heated and transformed into a curved omega stringer.

12 Claims, 3 Drawing Sheets

(56) References Cited

U.S. PATENT DOCUMENTS

| | | | | |
|---|---|---|---|---|
| 2006/0108057 A1* | 5/2006 | Pham | ................... | B29C 70/345 |
| | | | | 156/245 |
| 2006/0231981 A1* | 10/2006 | Lee | ...................... | B29C 33/307 |
| | | | | 264/320 |
| 2010/0124659 A1* | 5/2010 | Nelson | ............... | B29D 99/0014 |
| | | | | 428/411.1 |
| 2010/0285265 A1* | 11/2010 | Shinoda | .................. | B29B 11/16 |
| | | | | 428/80 |
| 2013/0036922 A1 | 2/2013 | Stewart et al. | | |
| 2013/0333830 A1* | 12/2013 | Stewart | ................ | B29C 70/342 |
| | | | | 156/182 |
| 2013/0340928 A1 | 12/2013 | Rotter et al. | | |
| 2014/0314996 A1* | 10/2014 | Stewart | .................... | B64C 1/00 |
| | | | | 428/152 |
| 2017/0095983 A1* | 4/2017 | Offensend | ............... | B29C 70/56 |

* cited by examiner

METHODS FOR MANUFACTURING CURVED OMEGA STRINGERS AND Z SHAPED STRINGERS OF COMPOSITE MATERIAL AND FOR MANUFACTURING A COMPOSITE MATERIAL STIFFENED PANEL WITH CURVATURE

CROSS-REFERENCES TO RELATED APPLICATIONS

This application claims the benefit of the European patent application No. 18382652.8 filed on Sep. 11, 2018, the entire disclosures of which are incorporated herein by way of reference.

FIELD OF THE INVENTION

This invention refers to a method for manufacturing curved omega stringers and Z shaped stringers of composite material, which can be used in composite material stiffened panels with curvature in aircraft (for example, fuselage panels, fan cowls, etc.).

The invention also refers to methods for manufacturing a composite material stiffened panel with curvature.

BACKGROUND OF THE INVENTION

Currently the stringers having a high curvature are made manually because of their high curvature. In some manufacturing methods there is a stage of automatic cutting of fabric patterns followed by a hand lay-up of the fabric patterns on a male tool.

US 2013/0340928 A1 describes a method and tooling apparatus for forming a composite charge into a contoured composite blade stringer including an elongate punch and an elongate die flexible along their lengths. The charge is press formed by using the punch to drive the charge into the die. The punch and the die are mounted between a pair of flexible plates. A press coupled with the plates contours the charge by bending the plates into a desired contour. The stringer is allowed to cool down to room temperature while being constrained, before withdrawing the stringer from the tooling apparatus in order to reduce wrinkling.

US 2013/0036922 A1 refers to a method and device for transporting, placing and compacting composite stiffeners. It discloses a device for compacting a contoured elongate composite lay-up that includes flexible first and second fiber reinforced resin flexible sections flexible along their lengths. The first section is flexible within a first plane and the second section is flexible within the first plane as well as within a second plane.

U.S. Pat. No. 7,708,546 B2 refers to an apparatus for forming structural members and provides a method and associated apparatus for forming a composite structural member from a charge. The charge can be disposed on a first die of the apparatus and formed to a desired configuration defined by a recess of the die by inserting a second die or a tool into the recess. In some cases, the first die can include two portions that are adjustable in a transverse direction so that the recess can be opened by the insertion of the second die or tool. The second die or tool can be a substantially rigid member or an inflatable bladder. In either case, the charge can be disposed on the first die, formed, and then further processed on the first die, thereby facilitating indexing of the charge for each operation.

WO 2010047980 A1, referred to a method and apparatus for forming highly contoured composite parts, discloses a method of forming a flat composite charge into a contoured composite part that reduces wrinkles in the part as the charge is being formed. Dies are used to form a portion of charge to the steepest contour of the part, while tension is maintained on the charge as the remaining portions of the charge are formed.

Although these methods allow the manufacturing of stringers having a high curvature, it would be desirable to obtain a manufacturing process with a high level of automation that avoids any deformations, waves or wrinkles on the head of the stringers.

SUMMARY OF THE INVENTION

Accordingly, an object of the present invention is to provide an automatic method for manufacturing large and complex omega stringers with high curvature that avoids the mentioned drawbacks.

The invention provides a method for manufacturing curved omega stringers of composite material, that comprises the following steps:
  automatic tape lay-up in an ATL machine ("Automated Tape Lay-up" machine) or in an AFP machine ("Automated Fiber Placement" machine) or in a FLU machine ("Fiber Lay-Up" machine) and automatic cutting of the contour, after which a straight preform with reinforcements is achieved,
  flat forming to get an omega shape on the straight preform to transform it into a straight omega shaped preform, and
  a curve forming step, in which the straight omega shaped preform is placed in a flexible tool comprising a longitudinally embedded stiff band and some laminate clamping means, the laminate clamping means located in the extremes of the flexible tool, the flexible tool being covered by mechanical closing means, such that the head of the straight omega shaped preform has reinforcements on both extremes, the reinforcements being held by the laminate clamping means during the forming process, and afterwards the straight omega shaped preform is heated and transformed into a curved omega stringer.

The longitudinally embedded stiff band avoids any deformation in the length of the head of the stringer, and the laminate clamping means allow the erasure of the waves or wrinkles that may appear in the extreme reinforcements of the head of the stringer.

The invention also provides a method for manufacturing curved Z shaped stringers of composite material, comprising the steps of the method for manufacturing a curved omega stringer of composite material, and an additional step in which the curved omega stringer is cut into two parts to obtain two curved Z shaped stringers.

The invention also provides a method for manufacturing a composite material stiffened panel with curvature, the panel comprising a skin, that comprises the following steps:
  manufacturing at least one curved omega stringer according to the method for manufacturing curved omega stringers of composite material of the invention,
  curing the at least one curved omega stringer, and
  integration of the at least one cured curved omega stringer with the skin to get a cobonded composite material stiffened panel with curvature.

The invention also provides a method for manufacturing a composite material stiffened panel with curvature, the panel comprising a skin, that comprises the following steps:

manufacturing at least one curved omega stringer according to the method for manufacturing curved omega stringers of composite material of the invention, integration of the at least one cured curved omega stringer with the skin, and cocuring of the at least one cured curved omega stringer with the skin to get a cocured composite material stiffened panel with curvature.

The invention also provides several advantages with respect to the prior art processes:

It allows a high quality and repetitive process for obtaining the shape of the omega stringer.

It allows a high level of automation of the manufacturing process.

It reduces recurrent costs and lead time in serial production.

Other characteristics and advantages of the present invention will be clear from the following detailed description of several embodiments illustrative of its object in relation to the attached figures.

DETAILED DESCRIPTION OF THE PREFERRED EMBODIMENTS

Figure 1:
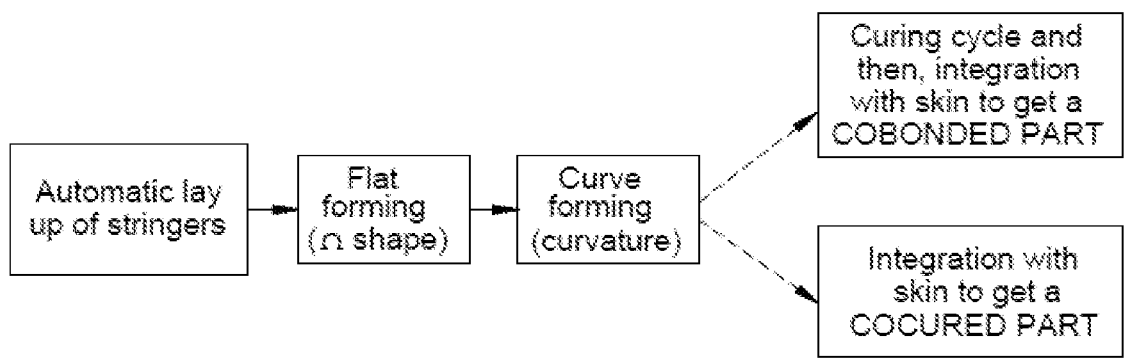
FIG. 1 is schematic diagram of the method of the invention.

In FIG. 1, the method for manufacturing curved omega stringers 1 of composite material of the invention is summarized. The main steps of this method are:

automatic tape lay-up in an ATL machine or in an AFP machine or in a FLU machine and automatic cutting of the contour, after which a straight preform with reinforcements 7 is achieved, flat forming to get an omega shape on the straight preform to transform it into a straight omega shaped preform 2, and a curve forming step, to obtain a curved omega stringer 1.

The omega stringer 1 with high curvature can be cured and then integrated with the skin of stiffened panels with curvature or an aircraft fuselage to get a cobonded part (as in current prior art processes), or it can be directly integrated with the skin to get a cocured part.

The first step comprises an automatic tape lay-up and automatic cutting. The preform of omega stringer is laying up automatically by an ATL machine or an AFP machine or in a FLU machine and the contour is cut. Several preforms can be laying up at the same time and the preforms will be achieved after the cutting step. This saves recurrent cost and lead time.

The plies in the 0° direction can only be located in the head of the stringer to be able to do the hot-forming process without wrinkles.

Figure 2:
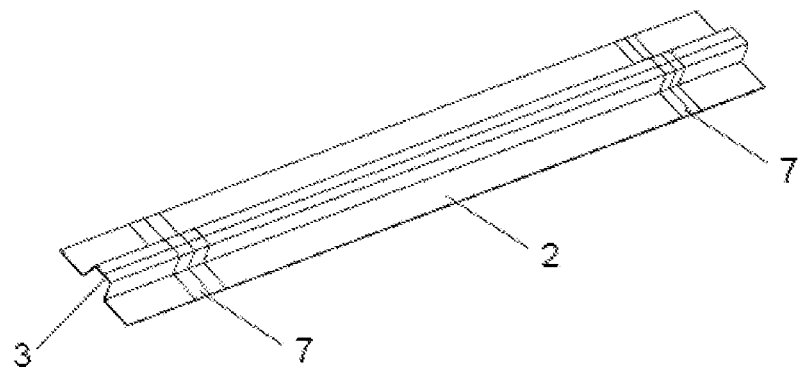
FIG. 2 is a perspective view of the straight preform obtained in intermediate steps of the invention.

The second step comprises a flat forming to get an omega shape 3 on the straight preform (see FIG. 2), transforming it into a straight omega shaped preform 2. A hot forming system can be used, or a press machine.

The curve forming step allows to get the high curvature in the stringer. In this step, the straight omega shaped preform 2 is located in a flexible tool 4 (FIGS. 3 and 4) to be able to form the stringer without wrinkles or waves.

The flexible tool 4 contains a longitudinally embedded stiff band 9 to avoid any deformation in the length of the head of the stringer and assure the correct geometry after the forming process.

Figure 3:
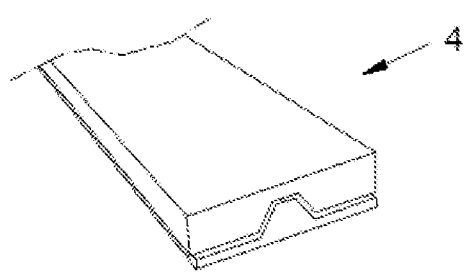
FIGS. 3 and 4 show the flexible tool used in the method of the invention.
Figure 4:
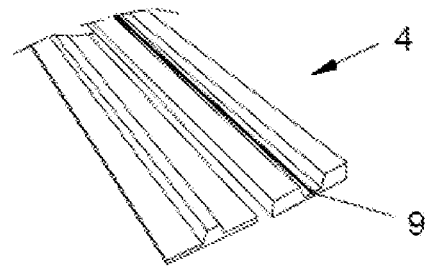

The flexible tool 4 can comprise two parts, as shown in FIGS. 3 and 4.

The longitudinally embedded stiff band 9 can be a metal band.

Figure 5:
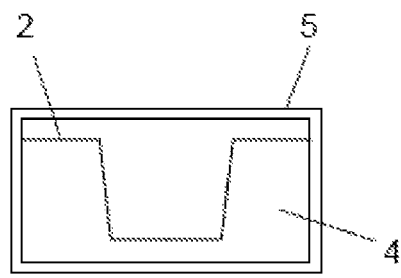
FIG. 5 shows the assembly of the preform, the flexible tool and the vacuum bag.

The stringer (as a straight omega shaped preform 2 at this stage) is placed in the flexible tool 4 and covered by mechanical closing means, preferably a vacuum bag 5, to create a rigid solid with vacuum and to avoid wrinkles (see FIG. 5).

Figure 8:
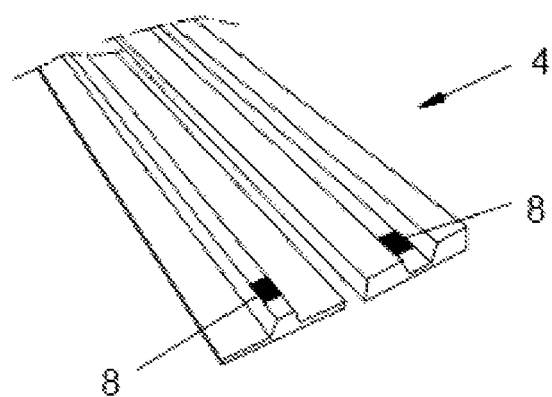
FIG. 8 shows the flexible tool with the laminate clamping means.
Figure 9:
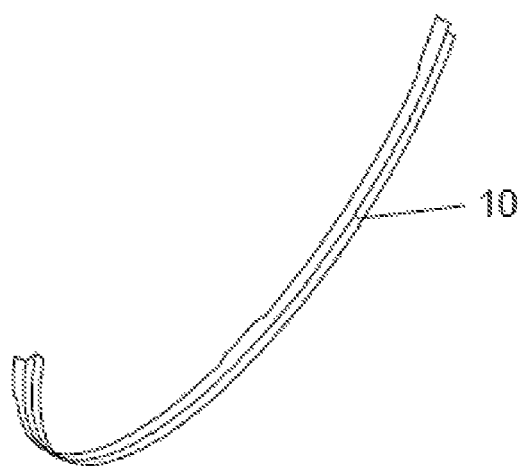
FIG. 9 shows a Z shape stringer manufactured according to the invention.

In addition, some laminate clamping means 8 are located in the extremes of the flexible tool 4 (see FIG. 8) to erase the waves or the wrinkles that appear in the extreme reinforcements 7 of the head of the stringer. The reinforcements 7 can be made with a stagger and longer than the laminate to be hold by the laminate clamping means 8 during the forming process.

Preferably, the laminate clamping means 8 can be abrasive means; for instance, they can be made of abrasive paper.

Then, it is heated up and transformed into a curved omega stringer 1 on the tool. It is necessary to have enough vacuum during the forming in order to avoid wrinkles.

The abrasive means can be abrasive films and the flexible tool 4 can be made of rubber.

Figure 6:
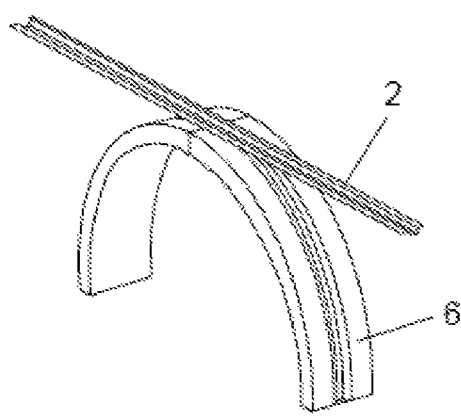
FIG. 6 shows the male tool for curve forming and the flexible tool with the preform.
Figure 7:
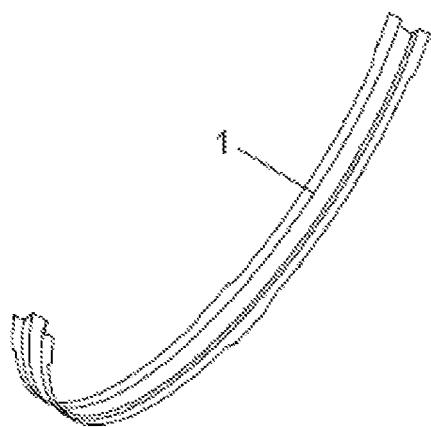
FIG. 7 shows a curved omega stringer manufactured according to the method of the invention.

Preferably a male tool 6 is used to transform the straight omega shaped preform 2 into a curved omega stringer 1 (see FIGS. 6 and 7).

The curved omega stringers 1 manufactured according to the above described method can be cut into two parts to obtain two curved Z shaped stringers 10.

A method for manufacturing a composite material stiffened panel with curvature, the panel comprising a skin, comprises the following steps:

manufacturing at least one curved omega stringer 1 according to the above described methods, curing the at least one curved omega stringer 1, and integration of the at least one cured curved omega stringer 1 with the skin to get a cobonded composite material stiffened panel with curvature.

Another method for manufacturing a composite material stiffened panel with curvature, the panel comprising a skin, comprises the following steps:

manufacturing at least one curved omega stringer 1 according to the above described methods, integration of the at least one cured curved omega stringer 1 with the skin, and cocuring of the at least one cured curved omega stringer 1 with the skin to get a cocured composite material stiffened panel with curvature.

Although the present invention has been fully described in connection with preferred embodiments, it is evident that modifications may be introduced within the scope thereof, not considering this as limited by these embodiments, but by the contents of the following claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing curved omega stringers of composite material, that comprises the following steps:
   automatic tape laying-up in an ATL machine or in an AFP machine or in a FLU machine and automatic cutting of a contour, to achieve a straight preform with reinforcements,
   flat forming to obtain an omega shape on the straight preform to transform the straight preform into a straight omega shaped preform,
   curve forming the straight omega shaped preform in a forming process by placing the straight omega shaped preform in a flexible tool comprising a longitudinally embedded stiff band and laminate clamping means, the laminate clamping means located in extreme positions of the flexible tool, the flexible tool being covered by mechanical closing means, such that a head of the straight omega shaped preform has the reinforcements on both extremes, the reinforcements being held by the laminate clamping means during the curve forming, and
   afterward the curve forming, heating the straight omega shaped preform and transforming the straight omega preform into a curved omega stringer.

2. The method for manufacturing curved omega stringers of composite material, according to claim 1, wherein the flat forming step is performed in a press machine.

3. The method for manufacturing curved omega stringers of composite material, according to claim 1, wherein the flat forming step is performed in a hot forming system.

4. The method for manufacturing curved omega stringers of composite material, according to claim 1, wherein the laminate clamping means are abrasive means.

5. The method for manufacturing curved omega stringers of composite material, according to claim 4, wherein the abrasive means are made of abrasive paper.

6. The method for manufacturing curved omega stringers of composite material, according to claim 1, wherein the flexible tool is made of rubber.

7. The method for manufacturing curved omega stringers of composite material, according to claim 1, wherein the mechanical closing means is a vacuum bag.

8. The method for manufacturing curved omega stringers of composite material, according to claim 1, wherein the longitudinally embedded stiff band is a metal band.

9. The method for manufacturing curved omega stringers of composite material, according to claim 1, wherein the flexible member comprises a male tool used to transform the straight omega shaped preform into a curved omega stringer.

10. A method for manufacturing curved Z shaped stringers of composite material, comprising the steps of the method of claim 1, and an additional step in which the curved omega stringer is cut into two parts to obtain two curved Z shaped stringers.

11. A method for manufacturing a composite material stiffened panel with curvature, the panel comprising a skin, comprising the following steps:
    manufacturing at least one curved omega stringer according to claim 1,
    curing the at least one curved omega stringer, and
    integration of the at least one cured curved omega stringer with the skin to obtain a co-bonded composite material stiffened panel with curvature.

12. A method for manufacturing a composite material stiffened panel with curvature, the panel comprising a skin, comprising the following steps:
    manufacturing at least one curved omega stringer according to claim 1,
    integrating the at least one cured curved omega stringer with the skin, and
    co-curing the at least one cured curved omega stringer with the skin to obtain a co-cured composite material stiffened panel with curvature.

* * * * *